United States Patent [19]

Schmid et al.

[11] Patent Number: 5,760,164
[45] Date of Patent: Jun. 2, 1998

[54] LIQUID SYSTEM FOR EXECUTING AN ANIONIC LACTAM POLYMERIZATION

[75] Inventors: Eduard Schmid, Bonaduz, Switzerland; Roman Eder, Filderstadt, Germany

[73] Assignee: Ems-Inventa Ag, Zurich, Switzerland

[21] Appl. No.: 784,975

[22] Filed: Jan. 21, 1997

[30] Foreign Application Priority Data

Jan. 25, 1996 [DE] Germany ............... 196 02 683.0

[51] Int. Cl.$^6$ ............... C08G 69/08; C08G 73/10
[52] U.S. Cl. ............. 528/310; 528/313; 528/322; 528/323; 528/332; 528/335; 528/336; 528/342
[58] Field of Search ............... 528/310, 313, 528/323, 322, 335, 336, 342, 332

[56] References Cited

U.S. PATENT DOCUMENTS

| | | | |
|---|---|---|---|
| 3,017,391 | 1/1962 | Mottus et al. | 528/310 |
| 3,575,938 | 4/1971 | Tierney | 528/310 |
| 3,681,473 | 8/1972 | Chow et al. | 528/312 |
| 4,195,163 | 3/1980 | Meyer et al. | 528/315 |
| 4,414,362 | 11/1983 | Lenke et al. | 525/178 |
| 4,598,125 | 7/1986 | Horn et al. | 528/183 |
| 4,599,398 | 7/1986 | Hodek et al. | 528/312 |

FOREIGN PATENT DOCUMENTS

| | | |
|---|---|---|
| 0438762 | 12/1990 | European Pat. Off. . |
| 1495132 | 7/1963 | Germany . |
| 2230732 | 6/1972 | Germany . |

OTHER PUBLICATIONS

"BASF Intermediate Products", 1993.

Primary Examiner—P. Hampton-Hightower
Attorney, Agent, or Firm—Browdy and Neimark

[57] ABSTRACT

A liquid system for executing the anionic lactam polymerization is proposed, which contains activators as well as catalysts and selectively additives and which is liquid at room temperature and remains stable when stored.

23 Claims, No Drawings

LIQUID SYSTEM FOR EXECUTING AN ANIONIC LACTAM POLYMERIZATION

FIELD OF THE INVENTION

The invention relates to a liquid system for executing the anionic lactam polymerization. It also relates to the use of the liquid system for executing the anionic lactam polymerization.

BACKGROUND OF THE INVENTION

In accordance with the relevant prior art, polyamides are mainly produced in accordance with the method of so-called hydrolytic polymerization from molten lactams at temperatures of approximately 200° to 320° C., wherein often a pressure phase with the addition of water is interposed ahead for opening the rings of the lactam. This reaction proceeds slowly. The reaction product, preferably a granular material, is converted to useful articles in a subsequent step, for example by means of an injection molding or extrusion process.

Strong bases which lead to the formation of metal lactamate, can also cause the conversion of lactam to polyamide. The corresponding polymerization reaction proceeds slowly and was replaced by the activated anionic lactam polymerization, wherein the reaction is greatly accelerated, and the polymerization temperature can be lowered below the melting point of the polymer. In this method the catalyst and activator are separately added to the molten lactam.

In this case the catalyst usually is a solid at room temparature, for example of an alkali- or alkaline-earth-lactamate. Also, many of the activators (or co-catalysts), such as carbodiimide and blocked isocyanates, are solids. The disadvantage of the free isocyanates, many of which are liquids, is their high toxicity.

The anionic lactam polymerization and the activated anionic lactam polymerization, as well as all aspects of polyamide synthesis and the corresponding applications are described, for example, in the Plastics Manual, Volume VI, Polyamides, C. Hanser, publishers, München.

The activated anionic lactam polymerization is generally performed for producing so-called cast parts or semi-finished parts of large dimensions, such a profiles, preferably in accordance with the so-called 2-tank method.

Herein lactam melts of the same volume and containing the catalyst or the co-catalyst are produced, combined and intensely mixed. The polymerization is started by this operation and the melt can be processed immediately thereafter into finished parts, for example by means of the so-called monomer casting method.

In this process it is necessary to observe as much as possible that the lactam melts are free of oxygen, the mixing and processing steps take place in an inert gas, and the melts, in particular catalyst-containing melts, have to be processed quickly since they age rapidly.

So-called liquid catalyst systems were developed to ease the rapid and homogeneous distribution of the catalyst, for example magnesium or sodium lactamate, in the lactam melt.

Reference is made in German Patent Publication DE 22 30 732 C3 to the difficulties caused by the addition of catalysts in solid form, for example metallic lactamate, to the activator- containing lactam melt. An inhomogeneous polymer is created unless rapid dissolving and even distribution are assured.

To solve the problem, a solution of alkali lactamate in lactam and containing 0.3 to 5.0 weight-% of a low-volatile amine and which is liquid at 90° C., is proposed by German Patent Publication DE-A-14 95 132.

A catalyst solution of metal lactamate in an N,N-disubstituted carbonamide, in particular in N-methylpyrrolidone, is described in U.S. Pat. No. 3,575,938. The following are cited there as further acid amides:

N, N-dimethylformamide, N,N-dimethylacetamide, N,N-dimethylpropionamide, N-phenyl-N-methyl acetamide, N-naphthyl-N-ethyl acetamide, N,N-diethyl isobutyramide, N-methylformanilide, N-ethylacetanilide, N-ethyl-4-nitroacetanilide, N,n-butyl acetanilide, N-ethyl-o-acetotoluidide, N,N'-p-phenylene-bis-acetanilide, 2-chloro-N-ethyl-acetanilide, N,N'-diphenylacetanilide, N,N'-diphenyl-formamide, N,N-diethylformamide, N-methyl-N-1-naphthyl-acetamide, N,N-di-n-butylacetamide, N,N-diisopropyl-propionamide, N-butyl-N-octyldecanamide, N-N-dimethyl-benzamide, N,N-diethyl-p-toluamide, N-methylpyrrolidone, N-phenyl caprolactam, N-ethyl-a-pyrrolidone, N-phenyl piperidone, N-isopropyl caprolactam, N-cyclohexyl dodecanolactam, N-acetyl pyridine, N-acetyl piperidine, n-propionyl morpholine, N-acetyl morpholine.

The improved addition and distribution of this catalyst solution in an activated lactam melt also permits the production of mineral-filled products. In air, the catalyst solutions immediately turn to slag, and they are not liquid at room temperature. Therefore they must be melted before use.

In accordance with the teachings of German Patent Publication DE 22 30 732 C3 it is necessary to prevent the crust formation, quickly exhibited by catalyst solutions made of alkali lactamate in 2-pyrrolidone and which interferes with the process, by the addition of higher alcohols. This solutions also solidify below 200° C.

Catalyst solutions with a high degree of stability when stored even at low temperatures are described in European Patent Publication EP 0 438 762 B1, which allow a rapid reaction and lead to polyamide with a relatively low amount of extractable. They consist of lactam, 2-pyrrolidone, special glycols, hydrocarbons and selectively contain amine. However, the low boiling points of individual components of the solutions greatly limit the use.

In the cited prior art it is necessary for performing the activated anionic lactam polymerization to always use the activator and catalyst solutions separately. Considerable process-technology-oriented disadvantages are connected with this: The activator must be added to the lactam melt in a prior step before it is possible to initiate the reaction by the addition of the catalyst solution.

OBJECT AND SUMMARY OF THE INVENTION

It was therefore the object of the instant invention to overcome the disadvantages of the prior art by means of a suitable catalyst/activator system, which is liquid at room temperature and remains stable when stored, which by itself is capable of initiating the polymerization of the lactam, which makes short polymerization times possible and leads to polylactams of high quality.

This object is attained, by means of the liquid system, for performing the anionic lactam polymerization containing a) 30 to 80 parts by weight of at least one N-substituted carbonamide compound of the formula

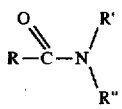

wherein R=hydrogen or a substituent with up to 12 C atoms, which can also contain hetero atoms and hetero groups, R'=a monovalent radical with up to 12 C atoms, which can also contain hetero atoms and hetero groups, R"=a monovalent radical with up to 20 C atoms, which can also contain hetero atoms, b) 5 to 30 parts by weight of at least one alkali and/or alkaline earth lactamate, c) 10 to 40 parts by weight of at least one compound which activates the anionic lactam polymerization, which is soluble in a) and d), d) 0 50 30 parts by weight of at least one N-substituted urea compound, wherein the proportions a), b), c) and d) add up to 100 parts by weight, and optionally additionally e) property- or application-dependent additives; and the use of this liquid system in amounts of 0.5 to 10 parts by weight for executing the anionic polymerization of the lactam.

This object is attained in particular by means of a liquid system which remains stable when stored, containing the activator and catalyst together and thereby makes the use of separate solutions of activator and catalyst unnecessary what assures an essential increase of the numbers of applications formulations and the processes.

It has been surprisingly found that the compounds suitable as activator, such as isocyanates, in particular blocked by lactams, carbodiimides and oxazolines, in particular by fatty alkyl bisoxazolines, are capable in the presence of catalysts with suitable solvents to form liquid systems at room temperature which are stable when stored in dry air.

Therefore the liquid system in accordance with the invention, which is to be added to a lactam melt free of water, essentially consists of a) at least one N-substituted carboxylic acid amide compound, which can also contain a heterocyclic ring formed by two of its substituents R and R' or R' and R", as the base component and solvent, b) at least one alkali or alkali-earth lactamate as the catalyst, c) at least one compound which activates the anionic lactam polymerization, and d) selectively at least one N-alkylated urea compound as additional solvent, wherein a), b), c) and d) add up to 100 parts by weight, e) in addition, selectively use- or application-dependent additives, which do not or only very marginally hinder the polymerization and are compatible with components a), b), c) and d).

N-alkylated and di-alkylated carboxylic acid amides a) per se are a part of the prior art, such as described in U.S. Pat. No. 3,575,938.

The fraction of component a) preferably is 30 to 70 parts by weight, in this connection lactams such as butyro-, valero-, capro- and laurinlactam, besides di-N-alkylformamide, N-acetylaniline, N-acetylpiperidine, N,N'-diacylpiperazine and N- alkylated lactam having C1 to C12 alkyl radicals, are preferred.

The fraction of lactamate b) advantageously lies between 5 and 25 parts by weight, in this connection sodium lactamate and in particular sodium caprolactamate and sodium laurin lactamate are preferred as alkali lactamates, and magnesium lactamate, in particular magnesium caprolactamate and magnesium laurin lactamate, as alkalin earth lactamates.

The production of the alkali and alkali-earth lactamates is a part of the prior art and described by way of examples in U.S. Pat. No. 3,575,938.

Sodium caprolactamate is a commercial product of Pacast AG, CH-7320 Sargans, Switzerland, and of L. Br üggemann, D-74076 Heilbronn, Fed. Rep. of Germany.

Preferred activating compounds c) are blocked, in particular with lactams, such as caprolactam-blocked, mono-, di- and polyisocyanates, among them in particular diphenyl methane diisocyanate, hexamethylene diisocyanate, toluol diisocyanate, isophorone diisocyanate, m- and p-xylidene diisocyanate, or phenyl isocyanate, mono- or polycarbodiimide, such as, for example, N,N'- diisopropyl carbodiimide, N,N'-di-(o-tolyl)-carbodiimide, N, N'- dicyclohexyl carbodiimide, 2,2',6,6'-tetraisopropyl diphenyl carbodiimide and poly-(2,2-diisopropyl)-p-phenylene carbodiimide, as well as oxazoline derivatives, oxazoline, oxazolone, N- substituted 2-oxazolidones, fatty alkyl oxazolines, hydroxy-fatty alkyl oxazolines, and oxazolines produced with hydroxy acids, such as ricinoleic acid, and their reaction products with isocyanates and diisocyanates. The latter are described in Farben und Lacke [Paints and Lacquers] 1993/11, pp 911 to 915.

The selectively used N-alkylated ureas d), such as tetramethyl urea and tetrabutyl urea, or N-dialkylated cyclic ureas, such as N,N'-dimethylpropylene urea or N,N'-dimethylethylene urea are known commercial products and are described in the company publication BASF-Zwischenprodukte (BASF Intermediate Products] 1993.

Selectively present additives e) with process- and use-dependent properties are known from the prior art:

Carboxylic acid ester, phosphoric acid ester, processing aids as well as e1) additives which affect the properties of the polylactam, such as heat and light stabilizers, antioxidants, tracers, aromatics, dyes, pigments, optical brighteners, plasticizers and ejecting agents, e2) additives which directly affect the course of the polymerization, such as amines, alcohols and glykols. Their effects are described in U.S. Pat. No. 3,017,391.

Preferred liquid systems are:

Liquid System 1:

a) 45 to 70 percent by weight N-alkyl-2-pyrrolidone 2 to 30 percent by weight caprolactam b) 5 to 30 percent by weight alkali lactamate c) 10 to 40 percent by weight lactam-blocked diisocyanate Liquid System 2:

a) 45 to 70 percent by weight N-alkyl-2-pyrrolidone 2 to 30 percent by weight caprolactam b) 5 to 40 percent by weight alkali lactamate c) 10 to 40 percent by weight mono- or polycarbodiimide Liquid System 3:

a) 45 to 70 percent by weight N-alkyl-2-pyrrolidone 2 to 30 percent by weight caprolactam b) 5 to 40 percent by weight alkali lactamate c) 10 to 40 percent by weight oxazoline compound The liquid system in accordance with the invention is a homogeneous mixture with is liquid at room temperature, stable in inert gas or dry air, which can be rapidly and homogeneously distributed when added to a anhydrous lactam melt and which directly initiates the polymerization.

The invention also includes the use of the liquid system in accordance with the invention for executing the anionic lactam polymerization. It is added to the anhydrous lactam, preferably in amounts between 0.5 and 10 parts per weight.

The polylactam produced by the process, such as polycaprolactam or in particular polylaurinlactam is of good quality and with an excellent mechanical property profile.

The production of the liquid systems in accordance with the invention will be explained below by way of examples.

DETAILED DESCRIPTION

EXAMPLES 1 to 6

Examples 1 to 5 describe the production of liquid systems.

It is recommended to work in a protective gas atmosphere when producing the liquid system.

The component a) is placed into a vessel with an interior temperature measuring device and heated to 30° to 70° C. Thereafter the component c) is added while stirring and is homogeneously mixed in. After a clear solution has formed component b) and subsequently the additives d), if required, are added while controlling the temperature, which must not exceed 70° C.

At room temperature, the resultant solutions are liquid and stable when stored.

COMPARISON EXAMPLE 60 parts by weight of N-methyl-2-pyrrolidone are heated in a nitrogen atmosphere to 50° C. in a vessel with an interior temperature measuring device. Subsequently 40 parts by weight of sodium caprolactamate (apprx. 3 to 5% Na content, Pacast Co., Sargans (CH)) are introduced while stirring. A clear solution is formed, which forms slag when cooled to room temperature.

EXAMPLES 6 TO 10

To test the liquid systems for performing the activated anionic lactam polymerization, the following procedure is used:

A lactam melt is placed into a vessel with an interior temperature measuring device in a nitrogen atmosphere, and the liquid system is introduced while the temperature is controlled and while stirring.

The period of time until the melt can no longer be stirred is used as the comparison time t for describing the course of the polymerization.

The melt is subsequently polymerized at 175° C. for 60 min.

TABLE 1

LIQUID SYSTEMS

| No | Component a) | Parts a) | Component b) | Parts b) | Component c) | Parts c) | Component d) | Parts d) | Remarks |
|---|---|---|---|---|---|---|---|---|---|
| 1 | NMP | 66 | Na—CL | 66 | PCD | 6.6 | DOS | 80.2 | orange-yellow, clear liquid |
| 2 | NMP CL | 50 16.6 | Na—CL | 16.6 | CL-MDI | 16.6 — | — — | — — | yellow clear liquid |
| 3 | BL | 40 | Na—CL | 25 | PCD | 25 | PA | 10 | clear liquid |
| 4 | NMP | 30 | Na—CL | 30 | Bis-Ox Rc-Ox | 10 30 | — — | — — | yellow clear liquid |
| 5 | NOP | 50 | Na—CL | 25 | CD | 25 — | — — | — — | yellow clear liquid |

NMP: N methyl 2 pyrrolidone
BL: Butyrolactam
NOP: N-octyl-2-pyrrolidone
Na—Cl: Sodium caprolactamate in caprolactam, apprx. 5% sodium content, Pacast AG, Sargans (CH)
PCD: Polycarbodiimide, Stabaxol P ®, Rhein Chemie GmbH, Mannheim (FRG)
CL-MDI: Methylenediisocyanate blocked with caprolactam, Grilbond IL6 ®, Ems Chemie AG, Domat/Ems (CH)
Bis-Ox: Ricinyl bisoxazoline, Loxamid 8523 ®, Henkel KG, Düeldorf (FRG)
Rc-Ox: Ricinyl oxazoline, Loxamid 8515 ®, Henkel KG, Düeldorf (FRG)
CD: Substituted diarylcarbodiimide, Stabaxol I ®, Rhein Chemie GmbH, Mannheim (FRG)
DOS: Di-octyl-sebacate, Edenol 888 ®, Henkel KG, Düeldorf (FRG)
PA: Phenolic antioxidant, Irganox 1135, Ciba-Geigy AG, Basel (CH).

TABLE 2

Use of the Liquid Systems of Examples 1 to 5 for the Lactam Polymerization

| No | Lactam | Parts | System acc. to | Parts | Melt Temp. | Compar. Zeit t | DSC-Melt Pt. of Polymer | Remarks |
|---|---|---|---|---|---|---|---|---|
| 6 | Laurinlactam | 100 | Example 1 | 10 | 175° C. | 320 sec | 176° C. | Plasticized by a) |
| 7 | Caprolactam | 100 | Example 2 | 6 | 140° C. | 70 sec | 211° C. | no discoloration |
| 8 | Laurinlactam | 100 | Example 3 | 3 | 175° C. | 200 sec | 170° C. | some discoloration |
| 9 | Laurinlactam | 100 | Example 4 | 3 | 175° C. | 10 sec | 170° C. | no discoloration |
| 10 | Laurinlactam | 100 | Example 5 | 3 | 175° C. | 120 sec | 171° C. | no discoloration |

What is claimed is:

1. A liquid system for performing the anionic lactam polymerization, comprising:
   a) 30 to 80 parts by weight of at least one N-substituted carbonamide compound of the formula

wherein R=hydrogen or a substituent with up to 12 C atoms, which can also contain hetero atoms and hetero groups,
   R'=hydrogen or a monovalent radical with up to 12 C atoms, which can also contain hetero atoms and hetero groups,
   R"=a monovalent radical with up to 20 C atoms, which can also contain hetero atoms,
   b) 5 to 30 parts by weight of at least one alkali and/or alkaline earth lactamate,
   c) 10 to 40 parts by weight of at least one compound which activates the anionic lactam polymerization, which is soluble in a) and d),
   d) 0 to 30 parts by weight of at least one N-substituted urea compound,
   wherein the proportions a), b), c) and d) add up to 100 parts by weight, and optionally additionally
   e) property- or application-dependent additives.

2. The liquid system in accordance with claim 1, wherein in the amide compound a) of formula I two of the substituents R and R' or R' and R" are linked with each other to form a ring system.

3. The liquid system in accordance with claim 1 wherein the proportion of the carbonamide compound a) is 30 to 70 parts by weight.

4. The liquid system in accordance with claim 1, wherein the proportion of the alkali or alkali earth lactamate b) is 5 to 25 parts by weight.

5. The liquid system in accordance with claim 1, wherein compound a) is selected from the group consisting of butyrolactam, valerolactam, caprolactam and its mixtures, laurinlactam, di-N-alkyl formamide, di-N-alkyl acetamide, N-acetyl aniline, N-acetyl piperidine, N,N'-diacyl piperazine and N-alkyl lactam having C1 to C12 alkyl radicals.

6. The liquid system in accordance with claim 1, wherein the alkali lactamate b) is a sodium lactamate.

7. The liquid system in accordance with claim 6, wherein the sodium lactamate is sodium caprolactamate or sodium laurin lactamate.

8. The liquid system in accordance with claim 1, wherein the alkaline earth lactamate b) is a magnesium lactamate.

9. The liquid system in accordance with claim 8, wherein the magnesium lactamate is magnesium caprolactamate or magnesium laurin lactamate.

10. The liquid system in accordance with claim 1, wherein the activating compound c) is selected from the group consisting of lactam-blocked monoisocyanate, diisocyanate and polyisocyanate, carbodiimide, polycarbodiimide, N-acylated carbonamide compound and oxazoline compound.

11. The liquid system in accordance with claim 10, wherein the oxazoline compound is selected from the group consisting of oxazoline derivatives, oxazoline, oxazolones, N-substituted N-2- oxazolidone, fatty alkyl oxazolines, and bisoxazolines produced by means of hydroxy acids and their reaction products with isocyanates.

12. The liquid system in accordance with claim 1, wherein the N-substituted urea compound d) is an N,N'- alkylated or an N,N'-alkylated cyclic urea compound.

13. The liquid system in accordance with claim 1, wherein the additives d) are selected from the group consisting of amines, polyamines, alcohols, glycols, carboxylic acid ester, phosphoric acid ester, light stabilizers, heat stabilizers, optical brighteners, plasticizers, tracers, aromatics and processing aids.

14. The liquid system in accordance with claim 1, composed of
   a) 45 to 70 percent by weight N-alkyl-2-pyrrolidone 2 to 30 percent by weight caprolactam
   b) 5 to 30 percent by weight alkali lactamate
   c) 10 to 40 percent by weight lactam-blocked diisocyanate.

15. The liquid system in accordance with claim 1, consisting of
   a) 45 to 70 percent by weight N-alkyl-2-pyrrolidone 2 to 30 percent by weight caprolactam
   b) 5 to 40 percent by weight alkali lactamate
   c) 10 to 40 percent by weight mono- or polycarbodiimide.

16. The liquid system in accordance with claim 1, consisting of
   a) 45 to 70 percent by weight N-alkyl-2-pyrrolidone 2 to 30 percent by weight caprolactam
   b) 5 to 40 percent by weight alkali lactamate
   c) 10 to 40 percent by weight oxazoline compound.

17. In a method for anionically polymerizing a lactam in the presence of an activator and catalyst, the improvement wherein the activator and the catalyst are added to the lactam in the form of the liquid system in claim 1 in amounts of 0.5 to 10 parts by weight.

18. A method in accordance with claim 17, wherein the lactam is caprolactam, laurinlactam, enantholactam or a mixture thereof.

19. The liquid system in accordance with claim 2, wherein the proportion of the carbonamide compound a) is 30 to 70 parts by weight.

20. The liquid system in accordance with claim 19, wherein the proportion of the alkali or alkali earth lactamate b) is 5 to 25 parts by weight.

21. The liquid system in accordance with claim 20, wherein the alkali lactamate b) is sodium lactamate.

22. The liquid system in accordance with claim 21 wherein the activating compound c) has been selected from the group of oxazoline derivatives, oxazoline, oxazolones, N-substituted N-2-oxazolidone, fatty alkyl oxazolines, and bioxazolines produced by means of hydroxy acids and their reaction products with isocyanates.

23. The liquid system in accordance with claim 22, wherein the N-substituted urea compound d) is an N,N'-alkylated or an N,N'-alkylated cyclic urea compound.

* * * * *